United States Patent [19]

Kaltz

[11] 4,217,391
[45] Aug. 12, 1980

[54] GLASS PANEL FOR LAND VEHICLES

[76] Inventor: Milton C. Kaltz, 10809 Balfour, Allen Park, Mich. 48101

[21] Appl. No.: 973,746

[22] Filed: Dec. 26, 1978

[51] Int. Cl.² .......................... B60J 7/04; B32B 17/06
[52] U.S. Cl. ................................. 428/428; 350/354; 428/426; 428/433; 428/441; 428/442; 428/913; 296/215
[58] Field of Search .................... 296/137 B, 137 E; 428/428, 433, 441, 442, 426, 913; 350/354; 65/DIG. 2

[56] References Cited

U.S. PATENT DOCUMENTS

| | | | |
|---|---|---|---|
| 3,208,860 | 9/1965 | Armistead | 65/33 |
| 3,384,324 | 5/1968 | O'Sullivan | 350/354 |
| 3,400,972 | 9/1968 | McIntyre | 350/354 |
| 3,406,085 | 10/1968 | Brown | 350/354 |
| 3,548,411 | 2/1969 | Barstow | 350/354 |
| 3,635,544 | 1/1972 | Stamm | 350/354 |
| 3,639,481 | 2/1972 | Innes | 528/113 |
| 3,756,692 | 9/1973 | Scott | 350354/ |
| 3,914,516 | 10/1975 | Ritter | 428/433 |
| 3,932,690 | 1/1976 | Gliemeroth | 350/354 |
| 3,964,784 | 6/1976 | Prechter | 296/137 E |
| 4,035,527 | 7/1977 | Deeg | 350/354 |

OTHER PUBLICATIONS

"Solex (Heat Absorbing) Polished Plate Glass", *PPG Glass Manual*, 1946, pp. 36-41.

*Primary Examiner*—Ellis P. Robinson
*Attorney, Agent, or Firm*—Basile and Weintraub

[57] ABSTRACT

A translucent glass panel particularly adapted for deployment with a land vehicle is defined by a laminar structure of a photometric glass sheet, a vinyl fabric, a reflective coating and a heat absorbing glass sheet. The translucent glass panels hereof are optimally employed as roof panels for land vehicles.

12 Claims, 2 Drawing Figures

GLASS PANEL FOR LAND VEHICLES

BACKGROUND OF THE INVENTION

I. Field of the Invention

The present invention pertains to glass panels for land vehicles. More particularly, the present invention concerns translucent glass roof panels for land vehicles. Even more particularly, the present invention concerns glare reducing translucent glass roof panels for land vehicles wherein the panel may evidence a color similar to that of the body of the land vehicle.

II. Prior Art

The manufacture, use and deployment of glass roof panels in land vehicles is, of course, well known. One of the more recent advents in this area has been the utilization and deployment of translucent glass roof panels. Such panels are employed to close openings formed in the roof of the vehicle. These panels may be manually removable from a suitable opening formed in the roof. Alternatively, a mechanized assembly connected to the panel enables it to slidingly open and/or close an opening formed in the roof of the vehicle. Ordinarily, these panels comprise a glass member which are bounded by a frame or the like and which sealingly closes the opening.

Usually, the glass employed in such panels are heat absorbing members or sheets which minimize the heat effect of the sun's rays beaming thereon. However, it is to be noted, that the presently known panels do not react to the degree of brilliance of the sun beaming down thereon. Hence, although the heat absorption factors may be minimized by the glass, the glare is in no manner considered. As will subsequently be detailed the present invention provides a photochromic glass panel which drastically reduces the impact of glare.

Another situation which is encountered with the present panels is of an aesthetic consideration. Conventional panels, as they are presently known, do not blend in with the color of the vehicle, per se. The glass is of a single color which may be aesthetically detracting from the overall appearance of the vehicle. The present invention, also, enables the provision of a panel which casts a hue similar to that of the vehicle.

The most pertinent prior art is found in U.S. Pat. No. 3,208,680 which pertains to photometric glass, per se as well as U.S. Pat. No. 3,964,784 which details the construction of the glass panel of the type under consideration herein.

SUMMARY OF THE INVENTION

In accordance with the present invention there is provided a translucent glass panel for a land vehicle which comprises:
  (a) a photometric glass sheet,
  (b) a transparent vinyl fabric adhered to the photometric glass sheet,
  (c) a reflective coating, and
  (d) a heat absorbing glass sheet, the reflective coating being deposited onto the heat absorbing glass sheet.

The translucent glass panel hereof is a laminar structure which meets all known vehicle safety standards. The present translucent glass panel is optimally deployed as a glass panel for closing an opening formed in the roof of the vehicle.

The vinyl fabric imparts a color to the glass panel as the beams of light from the sun reflect off the reflective coating and back through the vinyl. The vinyl is chosen to be complementary to the color of the land vehicle itself.

The reflective coating is either gold or silver in color.

The photometric glass panel utilized herein either darkens or brightens the glass panel in response to the intensity of the light beams impinging thereon. Hence, the more brilliant or brighter the sun's rays the darker the photometric panel will become in order to shade the interior of the vehicle. Conversely, the duller the sunlight the brighter the panel will become in order to brighten the interior of the vehicle.

For a more complete understanding of the present invention reference is made to the following detailed description and accompanying drawing. In the drawing, like reference characters refer to like parts throughout the several views in which:

DESCRIPTION OF THE PREFERRED EMBODIMENT

Figure 1:
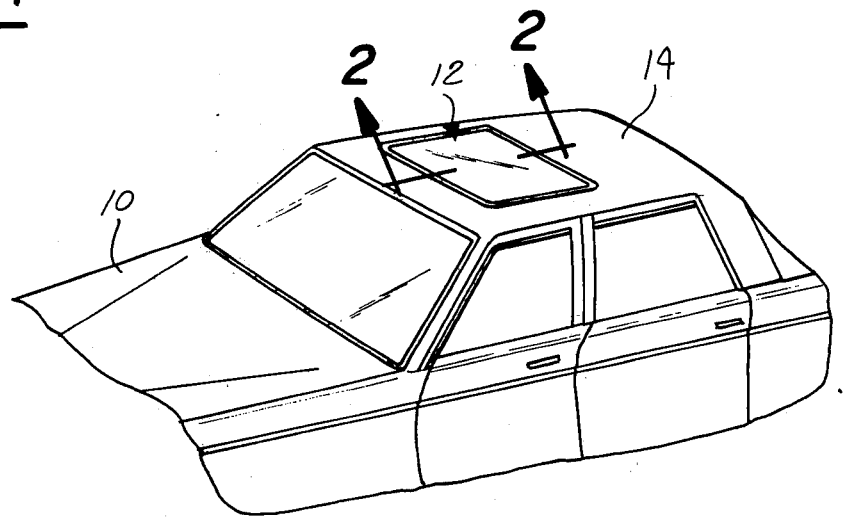
FIG. 1 is a broken, perspective view of a land vehicle having a glass panel in accordance with the present invention installed therewithin.

Now, and with reference to the drawing, there is depicted therein a land vehicle 10 having installed thereon a translucent glass panel generally indicated at 12. It is to be noted, as depicted in the drawing, the panel 12 is installed in the roof 14 of the vehicle 10. However, it is to be understood that in the practice of the present invention the panel 12 hereof could be installed as a windshield, back light, side window or as any other glass panel structure. However, it is preferred, that the panel 12 be deployed as a roof panel. Also, it is to be noted that the panel can be employed as part of a "hatch" roof system; removable panel or as a sliding roof panel. All such types of glass panels are within the scope of the present invention.

Figure 2:
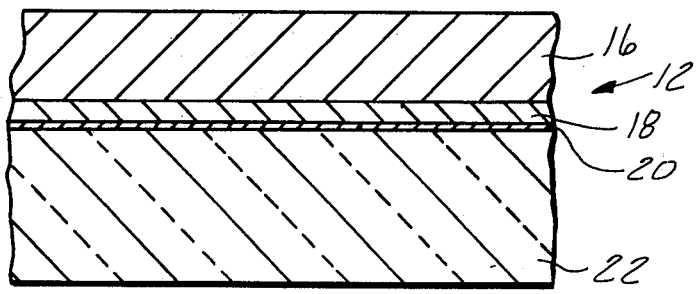
FIG. 2 is a cross-sectional view of the glass panel hereof taken along line 2—2 of FIG. 1.

Referring again to the drawing, and in particular FIG. 2, the panel 12 hereof generally comprises a laminar structure including an upper photometric or photochromic glass member or sheet 16, a vinyl fabric 18 adhered to the bottom of the photometric sheet 16, a reflective coating 20 and a heat absorbing glass sheet 22. The reflective coating 20 is deposited onto the upper surface of the heat absorbing sheet 22 and is immediately below the vinyl fabric 18. As noted, the entire structure is laminated to provide a unitary translucent glass panel 12.

As above noted, the upper panel is a photometric panel 16. As used herein and in the appended claims the term "photochromic" or "photometric" is intended to imply the ability to react reversibly to light. In other words, the more brilliant the light, the darker the appearance of the photochromic or photometric member. Concommitantly, the less intense the light the brighter the photometric or photochromic member. This phenomenon and its application to glass is, of course, well known. Photometric or photochromic glass has been historically described. Generally, this property can be imparted to glass with either organic or inorganic compounds. Typical organic compounds which are utilized to impart the photochromic capability to glass include stereoisomers, dyes, such as triphenyl methane dyes as well as other aromatic hydrocarbons. Representative inorganic compounds which are able to impart this property include alkaline earth sulfides, zinc sulfides, alkaline earth titanates, mercury compounds and silver halide compounds. This phenomenon is more particularly described in i.e., Spectrum, Vol. 3, No. 12, December, 1966, pages 39–47.

The photometric glass sheet utilized herein generally comprises a silicate glass which is sensitized by a silver halide composition. This type of panel is more particularly described in U.S. Pat. No. 3,208,860, the disclosure of which is hereby incorporated by reference.

The photometric sheet or pane hereof enables the entire glass panel 12 to respond, reversibly, to the intensity of the light impinging thereon to thereby darken or brighten the interior or passenger section of the land vehicle. Hence, in bright sunshine the passenger compartment of the vehicle will become shaded. In dull light the passenger compartment will remain bright.

Laminated to the undersurface of the photometric panel 16 is the vinyl fabric 18. The vinyl fabric 18 cooperates with the reflective coating 20 to impart a coloring or hue to the panel 12. It has been found that by proper selection of the vinyl, which is a transparent vinly, that a color can be imparted to the panel 12 which is the same as that of the vinyl which is selected for lamination herein. Hence, the vinyl enables the glass to take on a color which can be either the same as or complementary to that of the land vehicle itself. The color is imparted to the glass, as noted, by virtue of the cooperation of the vinyl roof and the reflective coating. As a light beam impinges upon the reflective coating, it redirects the light ray upwardly through the vinyl and the translucent photometric sheet. Since the photometric sheet is substantially clear or translucent the color imparted thereto is the same as that of the vinyl.

The vinyl fabric 18 can comprise any well known or commercially available transparent vinyl.

The reflective coating, as noted, is deposited onto the heat absorbing glass 22. The reflective coating is intended to minimize the brilliance of the sun's rays impinging upon the panel as well as to redirect the beams of light through the vinyl to impart the requisite color to the panel 12. The reflective coating is a heavy metal coating which is applied to the heat absorbing sheet 22 by any conventional mode such as manual application, spraying or the like. The heavy metal is, preferably, silver or gold in color.

Of course where no color is desired, the vinyl fabric and coating can be omitted.

The heat absorbing sheet 22 is employed to minimize the heat factors attributable to the sun's rays. Such heat absorbing panels are well known.

In manufacturing the present invention the same type of laminar assembly as employed in the above referred to U.S. Pat. No. 3,964,784 is employed.

In practicing the present invention the vinyl optimally has a thickness of about 0.030 inches.

It is to be appreciated that, while, the heat absorbing glass achieves its function there is a great psychological advantage to having the interior of the vehicle or the passenger compartment thereof darken in response to the brilliance of the light impinging thereon. Hence, the photometric sheet achieves this result.

It is to be appreciated that there has been described herein a new translucent glass panel for deployment with land vehicles. As described, the panel hereof reduces the "glare" of the sun while, concomittantly, casting a hue similar to that of the vehicle, if desired.

Having, thus, described the invention what is claimed is:

1. A translucent laminated glass panel for a land vehicle comprising:
   (a) a photometric glass sheet
   (b) a heat absorbing glass sheet, the photometric and heat absorbing sheets cooperating to reduce glare and absorb heat generated by the sun,
   (c) a transparent vinyl fabric adhered to the photometric glass sheet, and
   (d) a reflective coating deposited onto the heat absorbing glass panel immediately below the fabric.

2. The glass panel of claim 1 wherein:
   the vinyl is pre-selected to match the color of the land vehicle such that the glass panel casts a hue the same as the land vehicle.

3. The glass panel of claim 1 wherein:
   the vinyl has a thickness of about 0.030 inches.

4. The glass panel of claim 1 wherein:
   the glass panel comprises a sliding roof panel for a land vehicle.

5. The glass panel of claim 1 wherein:
   the glass panel comprises a removable roof panel for a land vehicle.

6. The glass panel of claim 1 wherein:
   the reflective coating is either silver or gold.

7. The glass panel of claim 6 wherein:
   the reflective coating is silver.

8. The glass panel of claim 6 wherein:
   the reflective coating is gold.

9. In a translucent viewing glass panel of the type adapted to be disposed in an opening formed in the roof a vehicle and for viewing therethrough, the improvement which comprises:
   (a) a photometric glass sheet,
   (b) a heat absorbing glass sheet laminated to the photometric sheet, and wherein the photometric and heat absorbing sheet cooperate to define the glass panel and to reduce glare and absorb heat generated by the sun.

10. The improvement of claim 9 wherein:
    the translucent panel comprises a sliding roof panel.

11. The improvement of claim 9 wherein:
    the translucent panel comprises a removable roof panel.

12. The improvement of claim 9 which further comprises:
    (a) a transparent vinyl fabric adhered to the photometric glass sheet, and
    (b) a reflective coating deposited onto the heat absorbing glass panel immediately below the fabric.

* * * * *